United States Patent [19]

Krevor

[11] Patent Number: 4,685,090
[45] Date of Patent: Aug. 4, 1987

[54] TUBULAR ARTICLE

[75] Inventor: David H. Krevor, San Carlos, Calif.

[73] Assignee: Raychem Corporation, Menlo Park, Calif.

[21] Appl. No.: 802,507

[22] Filed: Nov. 27, 1985

[51] Int. Cl.$^4$ .............................................. G01V 1/38
[52] U.S. Cl. .................................... 367/20; 367/154; 138/137; 174/101.5
[58] Field of Search ................... 367/15, 20, 106, 130, 367/154, 166, 169, 177; 181/110; 138/137; 174/101.5

[56] References Cited

U.S. PATENT DOCUMENTS

| 3,710,006 | 1/1973 | Davis | 174/101.5 |
| 3,729,919 | 5/1973 | Weichardt et al. | 174/101.5 |
| 3,744,016 | 7/1973 | Davis | 367/154 |
| 4,035,534 | 7/1977 | Nyberg | 138/137 |
| 4,044,187 | 8/1977 | Kremkau | 138/137 |

OTHER PUBLICATIONS

Principles of Underwater Sound by Robert J. Urick published 1967.

Primary Examiner—Charles T. Jordan
Assistant Examiner—John W. Eldred
Attorney, Agent, or Firm—Edith A. Rice; Herbert G. Burkard

[57] ABSTRACT

The invention relates to novel laminate tubular articles comprising an outer layer having a modulus of at least about $10^7$ Pascals, an interior layer comprising a polymeric material having a loss tangent of at least about 0.5 at a temperature of from about 0° C. to about 40° C. at a frequency of from 10–4,000 Hz and whose modulus is less than the modulus of the outer layer and an innermost layer having a modulus greater than the modulus of said interior layer. The invention further relates to a device for sensing in a body of water, said device comprising at least one sensor surrounded by the novel laminate tubular articles of the invention. The mechanical and acoustic properties of the article make it particularly appropriate for use as the hose in a towed-array sonar system.

17 Claims, 7 Drawing Figures

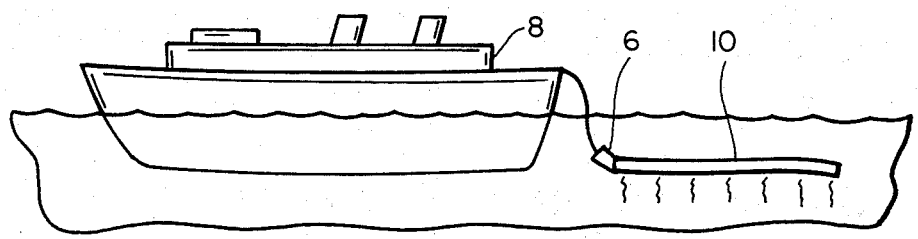
FIG_1
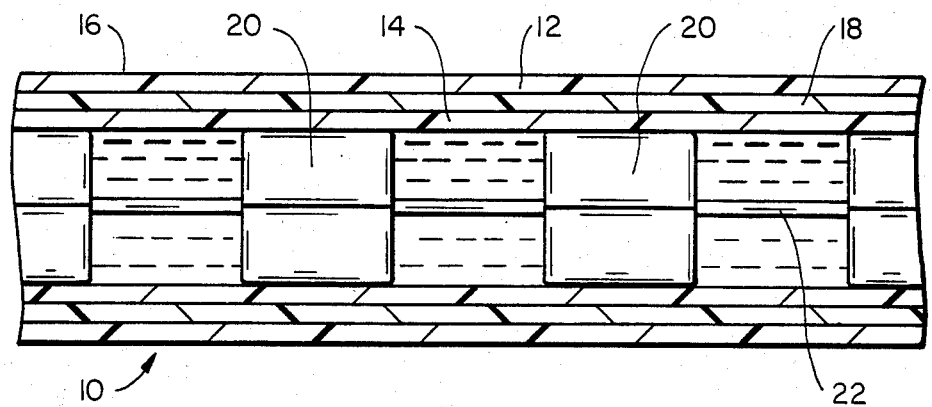
FIG_2
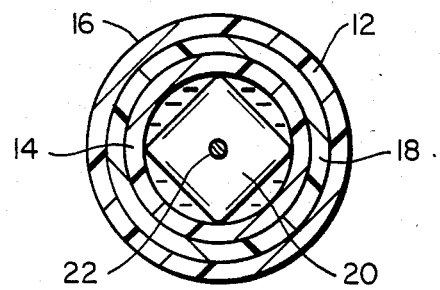
FIG_3

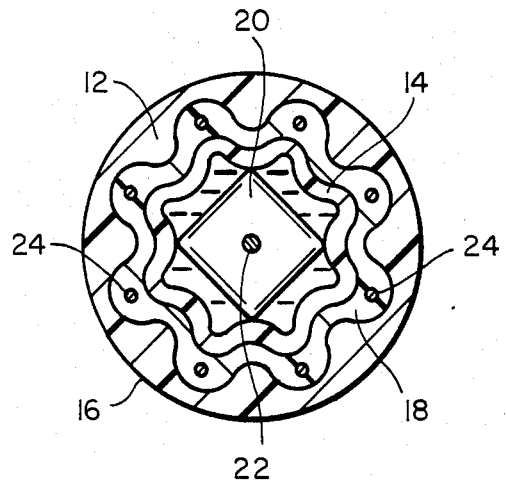
FIG_4
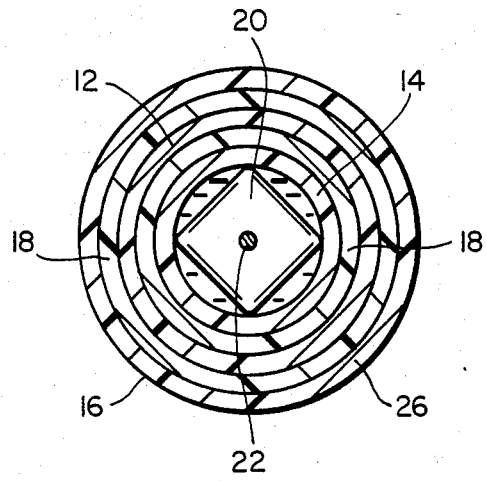
FIG_5

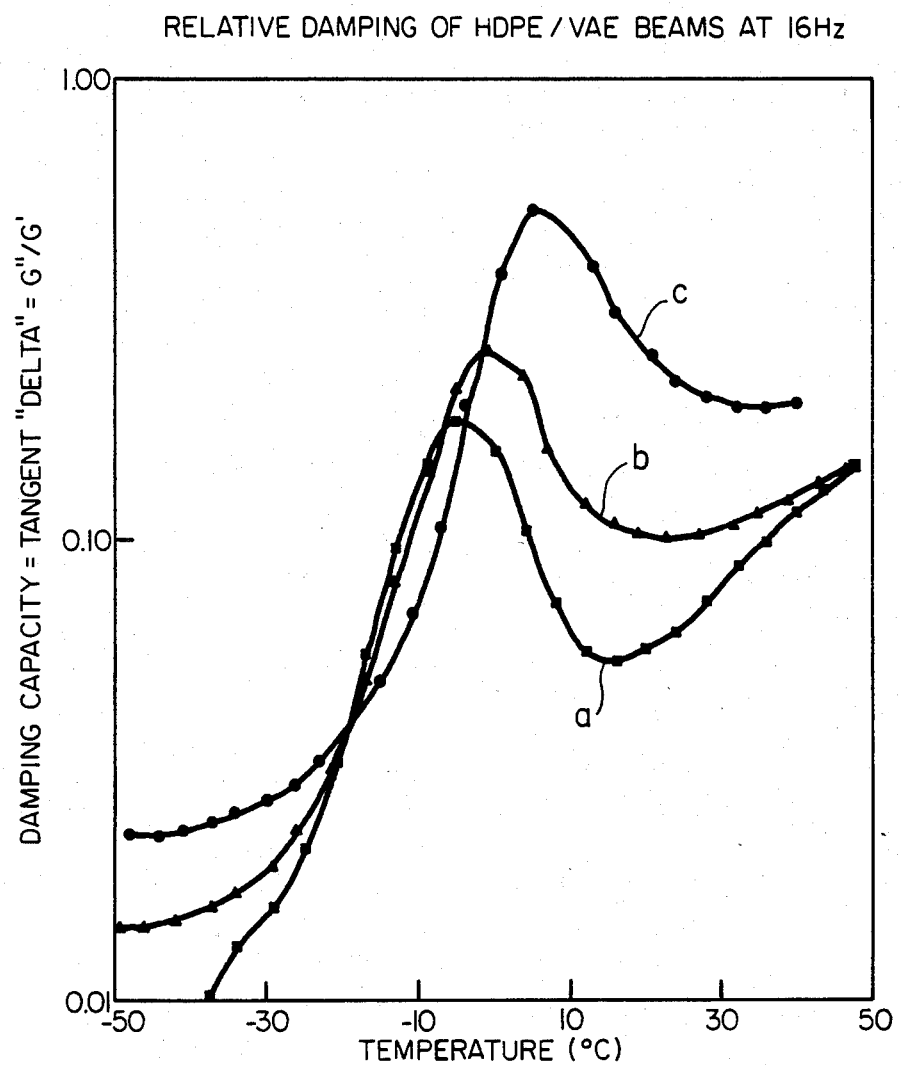
FIG_6

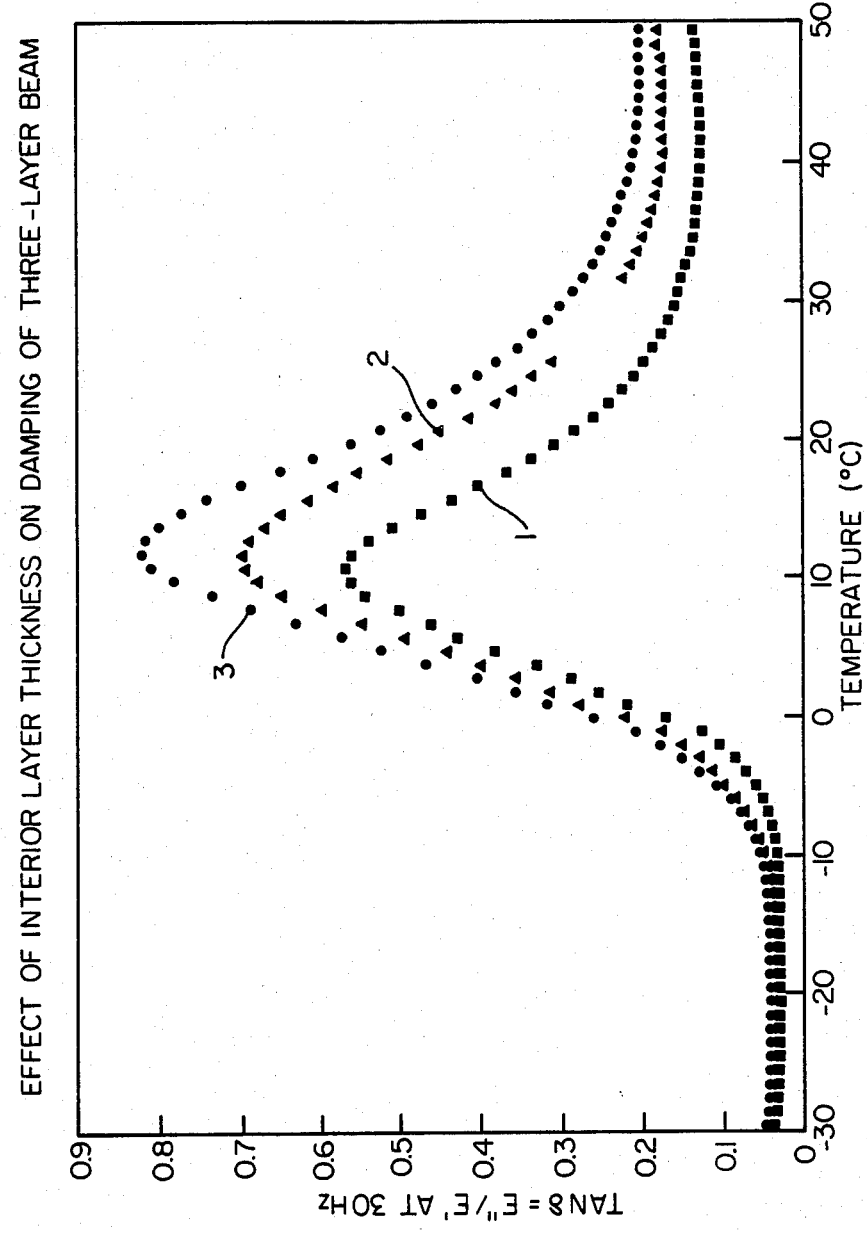

TUBULAR ARTICLE

BACKGROUND OF THE INVENTION (a) The Invention

The invention relates to a novel tubular article and to a device comprising one or more sensors surrounded by said tubular article, said device being useful for towing behind a vessel at sea as a towed-array sensor system.

(b) Background Invention

It is desirable to enclose articles such as electronic devices, transmitters, receivers or sensing instruments, (e.g. hydrophones used in sonar) in a tube which will protect them from the effects of water. Such tubing, which may be 100 meters or more in length, can then be used to make readings when towed by a vessel in the open sea. Typically, hydrophones are packed into a semi-rigid tube typically 1 to about 4 inches in diameter. The tubing is loaded with an acoustically transparent material such as oil through which sound may propagate and which may add buoyancy. The hydrophones are fixed in place by tying each of the string of hydrophones to the tube and sealing the tube.

This entire assemblage is typically known as a "towed-array" and is used as the sensing portion of a sonar system for both civilian and military applications.

It will be readily apparent that a high sensitivity of detection is desirable and that since this sensitivity is partly determined by the signal-to-noise ratio reaching the hydrophones, it is advantageous to reduce the acoustic noise generated within or by the array. As the array is pulled through the water, noise is generated from three separate mechanical excitations. The first is towline excitation originating either at the vessel or as towline strumming due to vortex shedding. The second is a tail end effect; array tension is low and the array may be susceptible to "snaking" instability. The third, and most important, noise source is the turbulent boundary layer (TBL) which develops as the array is drawn through water. The way in which the TBL creates noise is by generating bulge waves and/or extensional waves (either resonant or non-resonant) in the hosewall. The entire success of towed arrays depends on the isolation of the hydrophones from these surface pressures (whose spectral level increases as the fourth power of speed).

It is desirable, then, to use a tubing which provides for maximum transmission of the acoustic signals that the sensors are attempting to detect but which minimizes the noise created by the array and minimizes transmission of the noise. Two major properties of the material selected for tubing affect its acoustic properties. One property of material that significantly reduces noise is its ability to exhibit high mechanical damping. A second major property of the tubing is that it should not be too flexible, (i.e. should not have a low modulus) as this will more readily encourage the generation of bulge waves due to the TBL. This problem is further exacerbated by the fact that towed array tubes are limited in their wall thickness due to the size of the hydrophones, the degree of difficulty in towing large diameter tubing and the need to be radially compliant to permit it to be easily coiled for stronger handling purposes. Stiffness, therefore, due to wall thickness can not be changed to a great degree. Secondary considerations include the density of the material, abrasion resistance, resistance to the fill fluids and water, low temperature flexibility, creep resistance, the ability to take a good surface finish, and the ability to manufacture in continuous lengths.

Compositions that have been used for jacketing sonar detection arrays include plasticized polyvinyl chloride (PVC) and various rubbers, e.g. butyl rubber and nitrile rubber. However, while the elastomers have high mechanical damping, the elastomers suffer from disadvantages such as poor processing characteristics (especially for long lengths), poor abrasion resistance, insufficient stiffness, excessive weight and insufficient solvent resistance. Plasticized PVC can be easily processed, but is too stiff at low temperatures and the plasticizer is leached out by the acoustic fluids. Further the elastomers tend to be of relatively low modulus and thus tend to flex more often resulting in the creation of more noise. One method to achieve a balance between modulus and damping effects has been to blend an acoustic damping material with a material of higher modulus. However, these materials tend to be difficult and expensive to process into continuous tubing lengths.

In U.S. Pat. No. 4,410,012, a line array hose is described comprising a tube of soft flexible, thermoplastic material having high damping characteristics and a plurality of raised longitudinal ribs. The construction is described as having good self-noise damping properties and improved resistance to mechanical abuse. However, the raised longitudinal ribs cause an increased turbulence and noise at the TBL. Additionally, the hose is made of PVC and therefore has a high specific gravity.

In commonly assigned U.K. Application GB No. 2,123,011A, incorporated herein by reference, compositions comprising a segmented urethane block polymer and an elastomer having a glass transition temperature between $-40°$ C. and $+15°$ C. are described. These compositions maintain relatively high damping values of the elastomer while increasing modulus values.

It has been surprisingly found that a tubular article of the invention has good damping characteristics while maintaining a high modulus and is easy to process at relatively low cost.

SUMMARY OF THE INVENTION

One aspect of the invention relates to a tubular article comprising:
 (a) an outer layer comprising a polymeric material having a modulus of at least about $10^7$ Pascals;
 (b) an interior layer comprising a polymeric material having a loss tangent of at least about 0.5 at a temperature of from about 0° C. to about 40° C. and at a frequency of from 10–4,000 Hz and a modulus less than the modulus of the material of the outer layer; and
 (c) an inner layer having a modulus of at least $10^7$ Pascals, said modulus being greater than the modulus of said interior layer;
said layers being joined together to form a laminated tubular structure.

Another aspect of the invention relates to a device for sensing in a body of water comprising at least one sensor surrounded by a tubular laminate comprising:
 (a) an outer layer comprising a polymeric material having a modulus of at least about $10^7$ Pascals;
 (b) an interior layer comprising a polymeric material having a loss tangent of at least about 0.5 at a temperature of from about 0° C. to about 40° C. and at a frequency of from 10–4,000 Hz and a modulus less than the modulus of the material of the outer layer; and (c) an inner layer comprising a material having a modulus of at least $10^7$ Pascals, said modulus being greater than the modulus of said interior layer.

The device of the invention may be used with a device for reducing voxtex shedding and turbulent boundry layer noise transmitted to a sensing device comprising:

a vibration isolation module connected to a tubular article for containing the sensing device said tubular article comprising (a) an outer layer comprising a polymeric material having a modulus of at least about $10^7$ Pascals;

(b) an interior layer comprising a polymeric material having a loss tangent of at least about 0.5 at a temperature of from about 0° C. to about 40° C. and at a frequency of from 10–4,000 Hz and a modulus less than the modulus of the material of the outer layer; and (c) an inner layer comprising a material having a modulus of at least $10^7$ Pascals, said modulus being greater than the modulus of said interior layer.

In another aspect of the invention the tubular article comprises more than one interior layer surrounded by an additional inner or outer layer as appropriate (FIG. 5).

BRIEF DESCRIPTION OF THE DRAWING

FIG. 1 illustrates the tubing in accordance with this invention being used for sonar measurements.

FIG. 2 is a longitudinal cross-section view of an embodiment of the tubing in accordance with this invention.

FIG. 3 is a horizontal cross-section view of an embodiment of the tubing.

FIG. 4 is a horizontal cross-section view of an embodiment of the tubing wherein the inner surfaces of the tubing are not parallel.

FIG. 5 is a horizontal cross sectional view of an embodiment of the tubing showing additional interior and inner layers.

FIG. 6 is a graph showing the relative damping of HDPE/VAE laminates at 16 Hz.

FIG. 7 is a graph showing the effect of interior layer thickness on damping of three layer construction.

DETAILED DESCRIPTION OF THE INVENTION

Polymeric material for making the interior layer or layers of the laminated tubular article of this invention comprise polymers which exhibit good physical properties (such as high modulus, solvent and water resistance, low specific gravity, abrasion resistance, flexibility, ultraviolet stability, good weatherability, scrape resistance, good (i.e. smooth) surface finish, creep resistance), as well as acoustic damping characteristics. These polymers should preferably have a loss tangent of at least 0.5 and preferably greater than 1.0 at a temperature of from about 0° C. to about 30° C. at a frequency range of 10 to 4000 Hz. Loss tangent (tan $\delta$) is the ratio of the loss modulus to storage modulus and is measured by means of tension pendulus apparatus as described in ASTM-D-2236. See Great Britain Pat. No. 1,317,814 for a discussion and representative list of some polymers for damping use. Preferred polymers include elastomers such as ethylene/vinyl acetate copolymers, acrylonitrile/butadiene copolymers, butyl rubber, nitrile rubber, ethylene/vinyl acetate/methacrylic acid terpolymers, neoprene rubber, chlorinated polyethylene, chlorosulfonated polyethylene, fluorocarbon elastomers (e.g. Viton from DuPont), ethylene/propylene copolymers, styrene/butadiene copolymers, polyester elastomers (e.g. Hytrel from DuPont), polyurethane and nitrile/PVC blends.

Additives may be included in the polymeric material selected for the interior layer or layers. Additives may be selected to impart a desired property such as increased stiffness, specific gravity improved tensile strength, improved weatherability, increased viscosity during fabrication, etc. Additives include carbon black, graphite, talc, clays, calcium carbonate, mica, silica, glass, antimony oxide, etc. Further, reinforcing means such as fibers may be added to improve dimensional stability, especially longitudinal strength such as fibers made of nylon, dacron, Kevlar, glass (fiber glass), graphite, high-oriented polyethylene fibers, ceramic fibers and cellulosic fibers. Agents which can enhance crosslinking can also be added such as diallyl allyl phosphonate; triallyl phosphate; trimethylol propane trimethacrylate; triallyl cyanurate; triallyl isocyanurate; tetraethyleneglycol dimethacrylate; and phenylene dimaleimide. Further, the polymeric material should be substantially void-free to reduce acoustic problems caused by such voids.

The interior layer's or layers' wall thickness preferably is at least 0.01" and preferably is between about 0.05" and 0.2".

The outer layer or layers comprises a polymeric material. The polymeric material has a Young's modulus of at least $10^7$ Pascal and preferably between about $10^7$ and $10^9$ Pascal. Young's modulus is measured by ASTM E756. The modulus may be increased as desired by crosslinking. The polymeric material selected may be a thermoplastic or an elastomer as desired. The polymer may also have desirable damping characteristics although this is not necessary. The polymer of the outer layer should be compatible with the environment it is to be used in. That is, it should be resistant to aqueous conditions and to saline conditions where applicable. It is also desirable that the outer layer be abrasion resistant and easily laminated to the interior layer. It is further preferred that the layer(s) be substantially void-free. A preferred thickness of the outer layer is at least about 0.01 inches and preferably from about 0.015 to about 0.040 inches thick. The outer surface of the outer layer should be relatively smooth and should be substantially circular if it is the outermost layer of the article. The inner surface need not be smooth nor its cross-section circular (FIG. 4). Rather, its shape should be compatible with the interior layer's surface. Preferred materials are the thermoplastic polymers and in particular thermoplastics such as high density polyethylene, low density polyethylene, PVC, EVA, polyvinylidene fluoride, polyurethane, ethylene/ethyl acrylate copolymers, vinylidene fluoride/ethylene copolymers, ethylene/vinyl acetate copolymer, ionomers (e.g. Surlyn from DuPont), polyphenylene oxide, liquid crystalline polymers and nylon. Additives reinforcing means and crosslinking agents may be included in the same manner as previously described for the interior layer. Where more than one outer layer is used they may be of the same or different materials.

The inner layer or layers comprise a material having a modulus greater than the modulus of the interior layer. The Young's modulus of the inner layer(s) is preferably at least $10^7$ Pascal and preferably between about $10^8$ Pascal and $10^9$ Pascal. The inner layer(s) are preferably of a polymeric material. The polymer may be selected from the list for the outer layer being either the same or different than that used for the outer layer and may be the same or different when there is more than one inner layer (FIG. 5). In either event, the polymeric material preferably has a modulus between $10^7$ and $10^9$ Pascal, etc. and may include additives and reinforcements. The innermost inner layer may also comprise the outermost layer of the sensor (e.g. hydrophone). The outer surface of the inner layer may be rough or vary in thickness in order to conform to the interior layer.

An inner and outer layer is positioned on either side of an interior layer and laminated thereto by any convenient means. Any additional layers may be similarly applied. For example, polymeric inner and outer layers may be coextruded with the polymeric material of the interior layer. Another example to laminate the layers is to have each layer sequentially extruded. Another example comprises positioning inner and outer layers of a polymeric material on the inner and outer surface of a preformed tubular interior layer and bond them thereto by heat and pressure, a suitable adhesive, or by chemical means, such as crosslinking by chemical means or by irradiation. In another embodiment, the individual layers are laminated together to form the article by dimensional recovery techniques (i.e. a given layer in a dimensionally unstable form is positioned over another layer respectively and recovered thereon for example, by heat recovery). In a still further embodiment, the tubular layers may be formed by wrapping sheets of the appropriate material into the desired shape. Adhesion between layers may be further aided by selecting those compositions for the layers which are compatible such that an interaction occurs on heating of the layers. In any event, it is preferred that the laminated layers have a bond strength of at least about 3 lbs/linear inch.

In another embodiment of the invention, additional layers may be placed on the outside or inside of the tubular article. So, for example, additional layers could be placed on the innermost surface of the inner layer or the outermost surface of the outer layer of the article to provide desired benefits such as mechanical protection, compatibility with water or buoyancy fluids, means for towing, etc. Further, additional layers may comprise an additional interior layer and inner layer or interior layer and outer layer (see FIG. 5) to yield additional damping characteristics.

Only the outer surface of the outer layer (the outermost outer layer when there is more than one outer layer) need be circular. The inner and outer surface of the interior layer(s) need not be parallel in its horizontal cross-section. Both the thickness of the wall as well as the shape of said layers may vary as needed (e.g. to improve adhesion between layers, improve acoustics, reduce the cost of material, provide a means for introducing reinforcing fibers, etc.) (see FIG. 4).

The materials and dimensions of the various layers are selected such that the laminated tubular article preferably has a Young's modulus between about $10^7$ and $10^9$ Pa, and a loss tangent of at least 0.3 in the range of 0°–40° C. and 10–4,000 Hz. Typical dimensions for such tubular article in its recovered condition where appropriate are an outer diameter of 1 to 4 inches and a total wall thickness of from about 0.080 to 0.400 inches. Further, it is preferred that the tubular article be of a specific gravity of between about 1.0 to 1.10 to aid in the buoyancy of the tubular article plus sensing device. The entire article may be made dimensionally recoverable by conventional techniques. For example, the article may be subjected to radiation cross-linking from an appropriate source. The article may then be expanded to a dimensionally unstable form and then recovered to its original shape by heating as desired.

The hydrophones or other sensing devices may then be positioned inside the laminated tubular article along with a buoyancy fluid such as an isoparaffinic petroleum solvent (e.g. Isopar M from Exxon) where appropriate. In one method, the laminated tubular article is made dimensionally recoverable to facilitate positioning of sensing devices therein. The sensing device may be positioned inside a laminated tubular article which is in an expanded dimensionally unstable form and recovered around such devices to reach a dimensionally stable form. The tube is then sealed from the environment. The tube may then be attached to a vibration isolation modulus to insulate the sensing devices from towline excitation. A coupling device is connected to both the tubular article and the vibration isolation module by the load bearing members (e.g. reinforcing fibers) of each and then potted with epoxy or the like to maintain the connection.

It is believed that the superior performance of the tubular article is due to the constraining effect of the inner and outer layers on the inner and outer surfaces of the interior layer or layers. Accordingly, the interior layer is comprised of a high-damping material. The majority of the surface of the interior layer (i.e. greater than about 99%) is constrained due to its lamination to the inner and outer layers, therefore interior (intralayer) deformation of the interior layer is dominated by shear rather than constriction and dilation. The resultant damping is greater than for a similar two-ply structure, where circa 50% of the surface of the high-damping material would be free (i.e. unconstrained). For example, a three-ply construction of plastic (thickness "x")/elastomer (thickness "y")/plastic (thickness "x") would have higher damping characteristics than the analogous two-ply construction of plastic (thickness "2x")/elastomer (thickness "y") even though both systems have the same total thickness of each of the two materials.

For the total construction of the article therefore, both high damping and high modulus can be achieved and can be varied depending upon the geometry of the system (i.e. relative thicknesses of the layers) and the materials used. Because the article of the invention does not require a single compound or mechanically stable blend to meet all acoustic and mechanical criteria, much more latitude and freedom exists in the choice of materials of the present invention thus is a further advantage over the prior art hoses. The interior layer provides damping (enhanced by the phenomenom of constrained-layer damping). The inner and outer (constraining) layers provide high modulus, and the materials comprising the inner and outer layers may be varied independently according to specific environmental requirements (for example, the outer layer need a high-quality surface to minimize hydrodynamic noise whereas the inner layer may require oil-resistance to withstand the organic fill-fluid). Additionally, the system is adaptable to different modulus/damping requirements by modification of layer thicknesses or materials. Different levels of modulus or damping may be dictated by factors such as tow speed, temperature (arctic or tropics deployment) or frequency range of acoustic interest).

With reference to the drawings, wherein like reference characters designate like or corresponding parts throughout the views, in FIG. 1 there is shown a sonar cable in accordance with this invention generally indicated by 10, towed by a vessel 8 in the open sea and having vibration isolation module 6 attached to the sonar cable to insulate the acoustic module from vibration due to tow-line strum.

As shown in the longitudinal section of FIG. 2 and the cross-section of FIG. 3, tubular article 10 for enclosing a plurality of hydrophones 20 connected by connector 22 and comprises an interior layer polymer 18 is laminated on its outer surface by outer layer 12 and on its inner surface by inner layer 14 wherein the outer surface of the outerlayer 16 is smooth and circular.

In FIG. 4 the tubular article is shown with the outer surface of layer 12 being circular and with additional fiber reinforcements 24.

In FIG. 5 an embodiment of the invention is shown wherein additional layers outermost 26 and a further interior layer 18 placed on the article illustrated in FIG. 3 giving a 5-layer construction.

The phenomenom of a three-layer article of this invention is illustrated in FIG. 6. The figure shows the viscoelastic damping for three samples as a function of temperature at 16 Hz. Measurements were made in the torsional mode with a Rheometrics RMS-680 Mechanical Spectrometer. The three samples were all of identical length, width and thickness (63.5 mm×12.7 mm×1.52 mm) and the overall composition of each composite sample is identical (50% high-density polyethylene [HDPE] and 50% elastomeric ethylene/vinyl acetate [VAE] copolymer).

Sample "a" is an intensively mixed blend of HDPE and VAE. The beam is a single-ply, mechanically stable blend. Sample "b" is a two-ply laminate where one layer is HDPE and the other is VAE.

Sample "c" is a three-ply laminate of HDPE, VAE and HDPE where the VAE layer is "sandwiched" in-between two HDPE layers. The thickness of the VAE layer in beam "c" is the same as the VAE layer in sample "b". The thickness of each of the HDPE layers in sample "c" is one-half the thickness of the HDPE layer in "b".

FIG. 6 illustrates that sample "c" exhibits significantly higher damping than sample "b" which is higher than sample "a". As each sample is of identical size, shape and overall composition, this is due to geometrical construction. The superior damping of sample "c" appears to be due to the aforementioned phenomenom of constrained-layer-damping.

Examples 1, 2 and 3 are illustrated in FIG. 7 to show the effect of interior-layer thickness on overall damping. Examples 1, 2 and 3 are of the same materials and differ only in the relative thicknesses of the layers. FIG. 7 shows that the greater the thickness of the interior (damping) layer, the higher the overall damping.

The following examples illustrate the invention and are not intended to be limiting. One skilled in the art would be able to substitute materials, additives, reinforcements and blends thereof and the like based on the disclosure of the invention.

It should be stated that, whereas in the following examples both the outer and inner (constraining) layers are both made from the same plastic or plastic blend, it is not necessary for the outer and inner layers to be of the same material. Indeed, for many applications, it is highly desirable for the inner and outer layer to be of different materials. This is particularly true where the inner and outer layer would be exposed to different chemical environments (i.e. aqueous saline vs. organic oil).

DESCRIPTION OF THE PREFERRED EMBODIMENT

Example 1–20

In examples 1 to 16 a planar 3-ply laminate of the compositions used in the invention was tested for modulus and loss tangent (Tan δ) with results as follows (ASTM D1876). The planar laminates were made by compression molding using a conventional temperature-controlled hydraulic press (e.g. manufactured by Pasadena Hydraulics Inc.).

In examples 17 to 20 comparative examples using the same relative amounts of polymers were used but in a 2-ply laminate.

| Total Thickness" | Example | (Normalized Relative Thickness) | (Tan δ) max | Modulus (Pa) at (Tan δ) max | Temp (°C.) at (Tan δ) max | Corresponding 3-ply Example |
|---|---|---|---|---|---|---|
| | | 3-ply Laminate | | | | |
| .094 | 1 | A(.357)/B(.319)/A(.323) | .563 | 2.74e8 | 11 | |
| .076 | 2 | A(.242)/B(.528)/A(.230) | .690 | 8.02e7 | 12 | |
| .100 | 3 | A(.178)/B(.655)/A(.168) | .812 | 1.18e8 | 12 | |
| .060 | 4 | C(.294)/D(.400)/C(.305) | .577 | 1.59e8 | 15 | |
| .081 | 5 | C(.247)/D(.506)/C(.247) | .580 | 1.62e8 | 16 | |
| .104 | 6 | C(.191)/D(.610)/C(.199) | .721 | 9.38e7 | 17 | |
| .060 | 7 | C(.294)/B(.396)/C(.310) | .547 | 1.50e8 | 11 | |
| .081 | 8 | C(.258)/B(.514)/C(.228) | .592 | 1.36e8 | 13 | |
| .121 | 9 | C(.16)/B(.53)/C(.31) | .667 | 1.05e8 | 13 | |
| .090 | 10 | E(.194)/F(.579)/E(.227) | .795 | 1.33e8 | 11 | |
| .090 | 11 | E(.228)/G(.534)/E(.238) | .850 | 1.53e8 | 1 | |
| .081 | 12 | C(.291)/F(.452)/C(.257) | .813 | 1.02e8 | 9 | |
| .089 | 13 | H(.24)/J(.52)/H(.24) | .685 | 9.73e7 | 10 | |
| .089 | 14 | H(.24)/K(.52)/H(.24) | .689 | 1.02e8 | 16 | |
| .089 | 15 | L(.24)/J(.52)/L(.24) | .605 | 4.10e7 | 17 | |
| .089 | 16 | H(.24)/F(.52)/H(.24) | .875 | 7.69e7 | 12 | |
| | | 2-ply Laminate | | | | |
| .090 | 17 | E(.50)/F(.50) | .538 | 1.78e8 | 7 | 10 |
| .090 | 18 | E(.473)/G(.527) | .546 | 2.47e8 | −1 | 11 |
| .090 | 19 | H(.50)/F(.50) | .714 | 1.30e8 | 8 | 16 |

-continued

| Total Thickness" | Example | (Normalized Relative Thickness) | (Tan δ) max | Modulus (Pa) at (Tan δ) max | Temp (°C.) at (Tan δ) max | Corresponding 3-ply Example |
|---|---|---|---|---|---|---|
| .100 | 20 | C(.50)/F(.50) | .700 | 1.32e8 | 7 | 12 |

All data at 30 Hertz.

Materials used in Example 1–20

A. modified high-density polyethylene (Plexar 5970)
B. ethylene/vinyl acetate copolymer 45%
nitrile rubber (Paracril) 45%
graphite 10% blend
C. low-density polyethylene
(DYNH-1)
D. ethylene/vinyl acetate copolymer, 90%
graphite 10%
E. high-density polyethylene
(Marlex 5202)
F. ethylene/vinyl acetate copolymer
(VAE 711)
G. nitrile rubber
(Paracril CLT)
H. modified EVA resin (Plexar 3)
carbon black (3%) blend
J. ethylene/vinyl acetate copolymer
ethylene/vinyl acetate/methacrylic acid
terpolymer (Elvax 4320) (10%)
carbon black (3%) blend
K. ethylene/vinyl acetate copolymer
ethylene/vinyl acetate/methacrylic acid
terpolymer (10%)
talc (10%)
carbon black (3%) blend
L. ethylene/ethyl acrylate copolymer (DPD 6169)
ethylene/vinyl acetate/methacrylic acid
terpolymer (10%) (Elvax 4320)
carbon black (3%)
M. modified EVA copolymer
(Plexar 3)
N. ethylene/vinyl acetate copolymer
(high vinyl acetate content)
P. ethylene/ethyl acrylate copolymer (DPD 6169)
carbon black (3%) blend Example 21

Effect of Irradiative Cross-linking of Interlayer Adhesion

| | | Pounds (force) per linear inch To Separate | |
|---|---|---|---|
| Layers | Beam Agent Added | Unirradiated | Irradiated |
| F/C | no | 0.22 | 0.32 |
| F/M | no | 0.43 | 0.84 |
| D/A | no | 0.66 | 1.65 |
| N/H | yes | 1.60 | 4.17 |
| N/L | yes | 2.56 | 3.81 |
| N/P | yes | 2.89 | 4.38 |
| J/M | yes | 2.31 | 4.41 |
| K/M | yes | 3.37 | 6.09 |

Examples 22–26

The following 3-ply hoses were made by extruding on Davis Standard (single-screw) extruders (2½", 24:1 for the plastic, 2½", 20.1 for the elastomer) at temperatures of 200° to 320° F. for the elastomers and 210° to 330° F. for the plastic. Ingredients for each layer were premixed using a Banbury (30 lb.) intensive mixer until homogeneous. The plastic was then pelletized. The elastomer was milled and cut into 1–2½ inch wide strips for use in the rubber extruder.

Example 22

| Interior layer - 0.060–0.077 inches thick | |
|---|---|
| Vinyl acetate/ethylene copolymer (high VA content) | 89% |
| Graphite | 10% |
| Crosslinking Agents | 1% |
| Inner layer and outer layer each 0.019–0.035 inches thick | |
| Low density polyethylene | |

Example 23

| Interior layer 0.055–0.072 inches thick | |
|---|---|
| Nitrile rubber | 44.5% |
| Vinyl acetate/ethylene copolymer (high Va content) | 44.5% |
| Graphite | 10% |
| Crosslinking agents | 1% |
| Inner and outer layer each 0.019–0.034 inches thick | |
| Low density polyethylene | |

Example 24

Interior layer—0.071–0.095 inches thick
Ethylene-propylene-diene (EPDM) rubber
Inner and outer layer each 0.019–0.034 inches thick
Low density polyethylene Example 25

| Interior layer 0.015–0.040 inches thick | |
|---|---|
| Ethylene/vinyl acetate copolymer (high VA content) | 79% |
| Ethylene/vinyl acetate/methacrylic acid terpolymer | 9% |
| Talc | 9% |
| Carbon black | 2% |
| Crosslinking agent | 1% |
| Inner and outer layer each 0.010–0.070 inches thick | |
| Modified ethylene/vinyl acetate copolymer (low VA content) | 88% |
| Carbon black | 2% |
| Crosslinking agent | 1% |

Hoses of Example 25 were made both with and without longitudinal reinforcement fibers in the interior layer.

Example 26

| Interior layer 0.030–0.060 inches thick | |
|---|---|
| Ethylene/vinyl acetate copolymer (high VA content) | 83% |
| Ethylene/vinyl acetate/methacrylic acid terpolymer | 8% |
| Talc | 8% |
| Cross-linking agent | 1% |
| Inner and outer layer 0.015–0.035 inches thick | |
| Modified ethylene/vinyl acetate copolymer (low VA content) | 87% |
| Ethylene/vinyl acetate/methacrylic acid terpolymer | 10% |
| Carbon black | 2% |
| Cross-linking agent | 1% |

-continued

| with longitudinal fiber reinforcement |
|---|

What is claimed is:

1. A tubular article comprising:
   (a) an outer layer comprising a polymeric material having a Young's modulus of at least about $10^7$ Pascals;
   (b) an interior layer comprising a polymeric material having a loss tangent of at least about 0.5 at a temperature of from about 0° C. to about 40° C. and at a frequency of from 10–4,000 Hz and a Young's modulus less than the Young's modulus of the material of the outer layer; and
   (c) an inner layer having a Young's modulus from $10^7$ to $10^{10}$ Pascals, said modulus being greater than the Young's modulus of said interior layer;
said layers being joined together to form a laminated tubular structure in which the interior layer is constrained due to its lamination to the inner and outer layers such that the article exhibits constrained layer damping.

2. A tubular article according to claim 1, wherein the polymeric material of the interior layer has a loss tangent of at least about 1.0 in at least 1 point in the temperature range of 0° to 40° C. and frequency range of 10–4,000 Hz.

3. A tubular article according to claim 1, wherein the polymeric material of the outer layer has a Young's modulus of between about $10^7$ and $10^{10}$ Pascal.

4. A tubular article according to claim 1, which is dimensionally recoverable.

5. A tubular article according to claim 1, wherein the inner and outer layer each comprises a material selected from the group consisting of a low density polyethylene, high density polyethylene, ethylene vinyl acetate, a blend of ethylene/ethyl acrylate copolymer and ethylene/vinyl acetate/methacrylic acid terpolymer the inner and outer layers being the same or different.

6. A tubular article according to claim 1, wherein the interior layer comprises a material selected from the group consisting of a blend of ethylene/vinyl acetate copolymer and nitrile rubber, ethylene/vinyl acetate copolymer, nitrile rubber, a blend of ethylene/vinyl acetate copolymer and ethylene/vinyl acetate/methacrylic acid terpolymer, and EPDM rubber.

7. A tubular article according to claim 1, whereby interlayer adhesion is enhanced by cross-linking.

8. A tubular article according to claim 1, wherein interlayer adhesion is enhanced by inclusion in one or more of the layers of a crosslinking promotor.

9. A device for use as an acoustic module in a towed array sonar system comprising at least one hydrophone surrounded by a tubular article comprising:
   (a) an outer layer comprising a polymeric material having a Young's modulus of at least about $10^7$ Pascals;
   (b) an interior layer comprising a polymeric material having a loss tangent of at least about 0.5 at a temperature of from about 0° C. to about 40° C. and at a frequency of from 10–4,000 Hz and a Young's modulus less than the modulus of the material of the outer layer; and
   (c) an inner layer having a modulus of from $10^7$ to $10^{10}$ Pascals, said Young's modulus being greater than the modulus of said interior layer
said layers being joined together to form a laminated tubular structure in which the interior layer is constrained due to its lamination to the inner and outer layers such that the article exhibits constrained layer damping.

10. A device according to claim 9, wherein the polymeric material of the interior layer has a loss tangent of at least about 1.0 in at least 1 point in the temperature range of 0° to 40° C. and frequency range of 10–4,000 Hz.

11. A device according to claim 9, wherein the polymeric material of the outer layer has a Young's modulus of between about $10^7$ and $10^{10}$ Pascal.

12. A device according to claim 9, which comprises an additional innermost interior layer and an additional inner layer.

13. A device according to claim 9, wherein the inner and outer layer each comprises a material selected from the group consisting of low density polyethylene, high density polyethylene, ethylene vinyl acetate, a blend of ethylene/ethyl acrylate copolymer and ethylene/vinyl acetate/methacrylic acid terpolymer the inner and outer layers being the same or different.

14. A device according to claim 9, wherein the interior layer comprises a material selected from the group consisting of a blend of ethylene/vinyl acetate copolymer and nitrile rubber, ethylene/vinyl acetate copolymer, nitrile rubber, a blend of ethylene/vinyl acetate copolymer and ethylene/vinyl acetate/methacrylic acid terpolymer, and EPDM rubber.

15. A device according to claim 9, wherein the tubular laminate was dimensionally recovered around the sensing device.

16. A device according to claim 9, whereby interlayer adhesion of the tubular laminate is enhanced by cross-linking.

17. A device according to claim 9, wherein interlayer adhesion of the tubular laminate is enhanced by inclusion in one or more of the layers of a crosslinking promotor.

* * * * *